(12) United States Patent
Knobe et al.

(10) Patent No.: US 7,139,784 B2
(45) Date of Patent: Nov. 21, 2006

(54) DEAD TIMESTAMP IDENTIFICATION AND ELIMINATION

(75) Inventors: Kathleen Knobe, Cambridge, MA (US); Umakishore Ramachandran, Lilburn, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 496 days.

(21) Appl. No.: 10/629,357

(22) Filed: Jul. 29, 2003

(65) Prior Publication Data

US 2005/0027760 A1    Feb. 3, 2005

(51) Int. Cl.
G06F 17/30 (2006.01)
(52) U.S. Cl. .................. 707/206; 711/117; 711/127; 711/137; 711/100; 707/200
(58) Field of Classification Search ................ 707/200, 707/206, 1, 100, 104.1
See application file for complete search history.

(56) References Cited

U.S. PATENT DOCUMENTS 6,067,604 A      5/2000   Ramachandran et al.
2004/0193662 A1*  9/2004   Garthwaite ................. 707/206

OTHER PUBLICATIONS

U.S. Appl. No 09/549,351, filed Apr. 14, 2000, Knobe et al.
K. M. Chandy and J. Misra, "Asynchronous Distributed Simulation via a Sequence of Parallel Computations," Communications of the ACM, 24:198-206, 1981.
A. D. Christian and B. L. Avery, "Digital Smart Kiosk Project," In ACM SIGCHI 98, pp. 155-162, Los Angeles, CA, Apr. 18-23, 1998.
R. M. Fujimoto, "Parallel Discrete Event Simulation," Comm. of the ACM, 33(10), Oct. 1990.
R. M. Fujimoto, "Parallel and Distributed Simulation," In Winter Simulation Conference, pp. 118-125, Dec. 1995.
D. R. Jefferson, "Virtual Time," ACM Transactions on Programming Languages and Systems, 7 (3):404-425, Jul. 1985.
K. Knobe, et al., Scheduling constrained dynamic applications on clusters. In Proc. SC99: High Performance Networking and Computing Conf., Portland, OR, Nov. 1999. Technical paper.
R. S. Nikhil and U. Ramachandran, Garbage Collection of Timestamped Data in Stampede. In Proc. Nineteenth Annual Symposium on Principles of Distributed Computing (PODC 2000), Portland, Oregon, Jul. 2000.
J. M. Rehg, et al., "Vision for a Smart Kiosk," In Computer Vision and Pattern Recognition, pp. 690-696, San Juan, Puerto Rico, Jun. 17-19, 1997.
P. R. Wilson, Uniprocessor Garbage Collection Techniques, Yves Bekkers and Jacques Cohen (eds.). In Intl. Wkshp. on Memory Management (IWMM 92), St. Malo, France, pp. 1-42, Sep. 1992.

* cited by examiner

*Primary Examiner*—Mohammad Ali
*Assistant Examiner*—Leon J. Harper
(74) *Attorney, Agent, or Firm*—Richard P. Lange

(57) ABSTRACT

The performance of an application is improved by identifying and eliminating items with dead time-stamps and eliminating work on items with irrelevant time-stamps. An algorithm executing in each node of a task graph computes and propagates guarantees which are used to eliminate both items with dead time-stamps and irrelevant computation on dead time-stamps. A continuous garbage collector eliminates items with dead time-stamps while the node continues to process received items. Unnecessary computations are reduced by automatically discerning the interest set of downstream modules for time-stamps and feeding the interest set back to upstream modules.

36 Claims, 8 Drawing Sheets

DEAD TIMESTAMP IDENTIFICATION AND ELIMINATION

BACKGROUND OF THE INVENTION

Several emerging applications are continuous in nature and the processing usually involves combining time-stamped inputs from sensors that are distributed in space with contextual data of the specific application environment. In a continuous application, upstream computational modules continuously generate data with a certain periodicity and pass the data to downstream modules for analysis and action.

FIG. 1 illustrates the software architecture of a prior art continuous application for processing timestamped inputs. An example of a continuous application is a Smart Kiosk, an interactive multimedia public user interface. The Smart Kiosk 100 interacts with customers in a natural, intuitive fashion using a variety of input and output devices such as, video cameras 102, 104, microphones 106, loudspeakers, touch screens 108, infrared and ultrasonic sensors.

The Smart Kiosk uses computer vision techniques to track, identify and recognize one or more customers in the field of view. The Smart Kiosk may initiate and conduct conversations with customers. Recognition of customer gestures and speech may be used for customer input. Synthetic emotive speaking faces and sophisticated graphics, in addition to Web-based information displays may be used for the Smart Kiosk's responses. The input analysis hierarchy 150 attempts to understand the environment immediately in front of the Smart Kiosk. At the lowest level, sensors provide regularly-paced streams of data, such as images at 30 frames per second from the video cameras 102, 104. In the quiescent state, a blob tracker 110 does simple repetitive image-differencing to detect activity in the field of view. When such an activity is detected, a color tracker 112 can be initiated. The color tracker 112 checks the color histogram of the interesting region of the image, to refine the hypothesis that an interesting object, for example, a human is in view. If successful, the color tracker can invoke higher-level analyzers such as a face detector 114 to detect faces and an articulated body detector 116 to detect human (articulated) bodies. Still higher-level analyzers such as a gaze detector 120 looks for gaze and a gesture detector 122 looks for gestures. Similar hierarchies can exist for audio and other input modalities, and these hierarchies can merge as multiple modalities are combined to further refine the understanding of the environment in front of the Smart Kiosk.

The parallel structure of applications such as the Smart Kiosk is highly dynamic. The environment in front of the Smart Kiosk, that is, the number of customers and their relative position, and the state of the Smart Kiosk's conversation with the customers affect which threads are running, their relative computational demands, and their relative priorities. For example, threads that are currently part of a conversation with a customer are more important than threads searching the background for more customers.

One problem in implementing an application such as the Smart Kiosk is memory management. FIG. 2 illustrates a simple vision pipeline 200 for the prior art continuous application shown in FIG. 1. The digitizer 202 produces digitized images every 30th of a second. The Low-fi tracker 206 and the Hi-fi tracker 208 analyze the frames 204 produced by the digitizer 202 for objects of interest and produce their respective tracking records 210, 212. The algorithmic complexity in the tracker modules 206, 208 usually prevents them from keeping up with the digitizer's rate of frame production. It is common to have a Low-fi tracker 206 that uses a heuristic such as color for tracking, to operate at about 15–20 frames/second and a Hi-fi tracker 208 that uses a more sophisticated algorithm such as face detection to operate at about 1–2 frames/sec. The decision module 214 combines the analysis of such lower level processing to produce a decision output 216 which drives the Graphical User Interface ("GUI") 218 displayed on the display 220 that converses with the customer in front of the Smart Kiosk.

SUMMARY OF THE INVENTION

Computations performed on the data increase in sophistication and take more time to be performed as the data moves through the pipeline. Consequently, not all the data that is produced at lower levels of the processing for example, by the Hi-fi tracker 208 will necessarily be used at the higher levels. As a result, the data sets become temporally sparser and sparser at higher levels of processing because they correspond to higher and higher-level hypotheses of interesting events. For example, the lowest-level event may be "a new camera frame has been captured", whereas a higher-level event may be "John has just pointed at the bottom-left of the screen". Due to the difference in the computational granularities of the modules as well as the latencies for message transport through the interconnect, it is possible for upstream modules to perform computations that produce data items that are not of interest to the downstream modules.

Indiscriminate production of unwanted items by upstream modules results in clogging the memory system because memory resources are limited. Also, data performance guarantees such as adequate interactive response may not be met because computational resources are also limited.

Timely and efficient elimination of unwanted or irrelevant items, produced by upstream modules in an application improves the performance of the application. This invention presents a method and apparatus for identifying and removing data with irrelevant timestamps and eliminating work on items with irrelevant timestamps.

An application can be represented as group of interconnected nodes in a task processing graph. Tasks may operate at different speeds, resulting in slower upstream nodes computing data that will not be used by downstream nodes. Each node in the task processing group computes the earliest timestamp forwarded from nodes upstream that will be used by the node and the earliest timestamp that the node will forward to downstream nodes. The computation of the earliest timestamps in the node is dependent on guarantees propagated from successive and preceding nodes of the task graph. A forward guarantee propagated to successive or downstream nodes guarantees that an earlier timestamp will not be forwarded to the downstream nodes. A backward guarantee propagated to preceding or upstream nodes guarantees that an earlier timestamp will not be used by the downstream nodes. The propagated backward guarantee and forward guarantee are used to determine unwanted items.

Garbage collection and scheduling are performed at individual nodes of a processing graph by determining timestamp requirements for data to be processed in the node. The timestamp requirements are determined based on forward guarantees received from preceding nodes and backward guarantees received from successive nodes. The forward guarantees indicate earliest timestamps to be sent from the preceding nodes. The backward guarantees indicate earliest timestamps to be used at the successive nodes. A backward guarantee of earliest timestamps to be used at the node is returned to preceding nodes to allow data and computations corresponding to timestamps earlier than the backward guarantee to be eliminated at the preceding nodes. The backward guarantee is the latest timestamp selected from the latest timestamp received from preceding nodes and the earliest timestamp received in backward guarantees from successive nodes.

A forward guarantee is propagated to successive nodes based on forward guarantees received from preceding nodes. The propagated forward guarantee is the earliest of all the received forward guarantees. The forward guarantee may be propagated periodically or each time an item leaves the node and may be forwarded to a downstream node with the item.

The preceding node may be a thread or a channel. If the preceding node is a thread, the thread eliminates computations for items having a timestamp earlier than the latest backward guarantee propagated to the preceding node. If the preceding node is a channel, the channel eliminates items having a timestamp earlier than the latest backward guarantee propagated to the preceding node. The channel may eliminate items each time an item enters the channel.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 3:
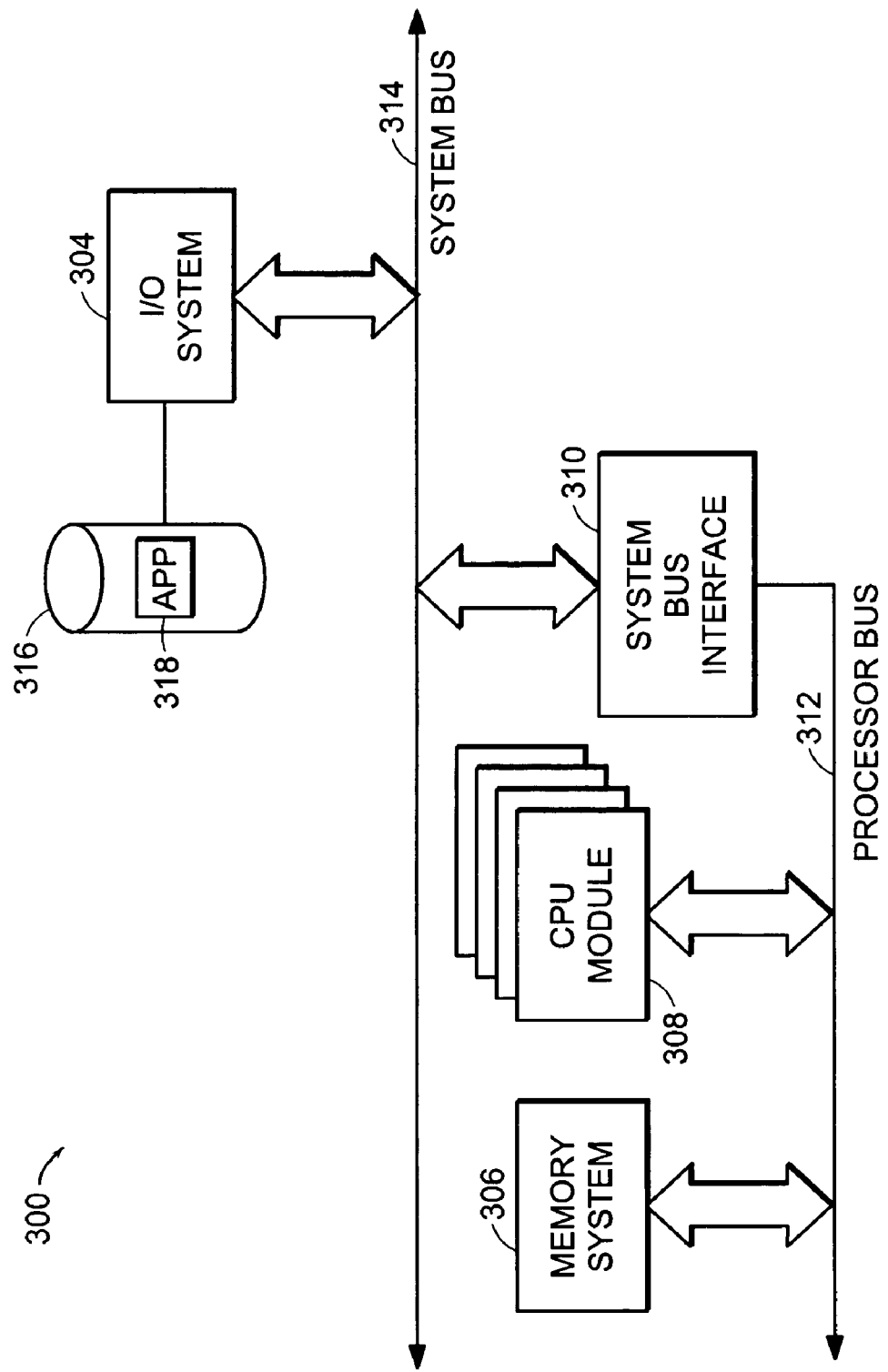
FIG. 3 is a block diagram of a computer system for executing an algorithm which collects garbage and eliminates unnecessary computations according to the principles of the present invention.

A description of preferred embodiments of the invention follows:

FIG. 3 is a block diagram of a computer system 300 for executing an application 318 which collects garbage and eliminates unnecessary computations according to the principles of the present invention. Included in the computer system 300 are at least one Central Processing Unit ("CPU") module 308, a memory system 306 and a system bus interface 310 connected by a processor bus 312. The CPU module 308 includes a processor (not shown). The system bus interface 310 is further connected to an Input/Output ("I/O") system 304 by a system bus 314. An external storage device 316 is connected to the I/O system 304. The application 318 which collects garbage and eliminates unnecessary computations according to the principles of the present invention is stored in the storage device 316 and also stored in the memory system 306. The application 318 is a constrained dynamic application. For example, the constrained dynamic application can be the color tracker application 112 shown in FIG. 1.

Figure 1:
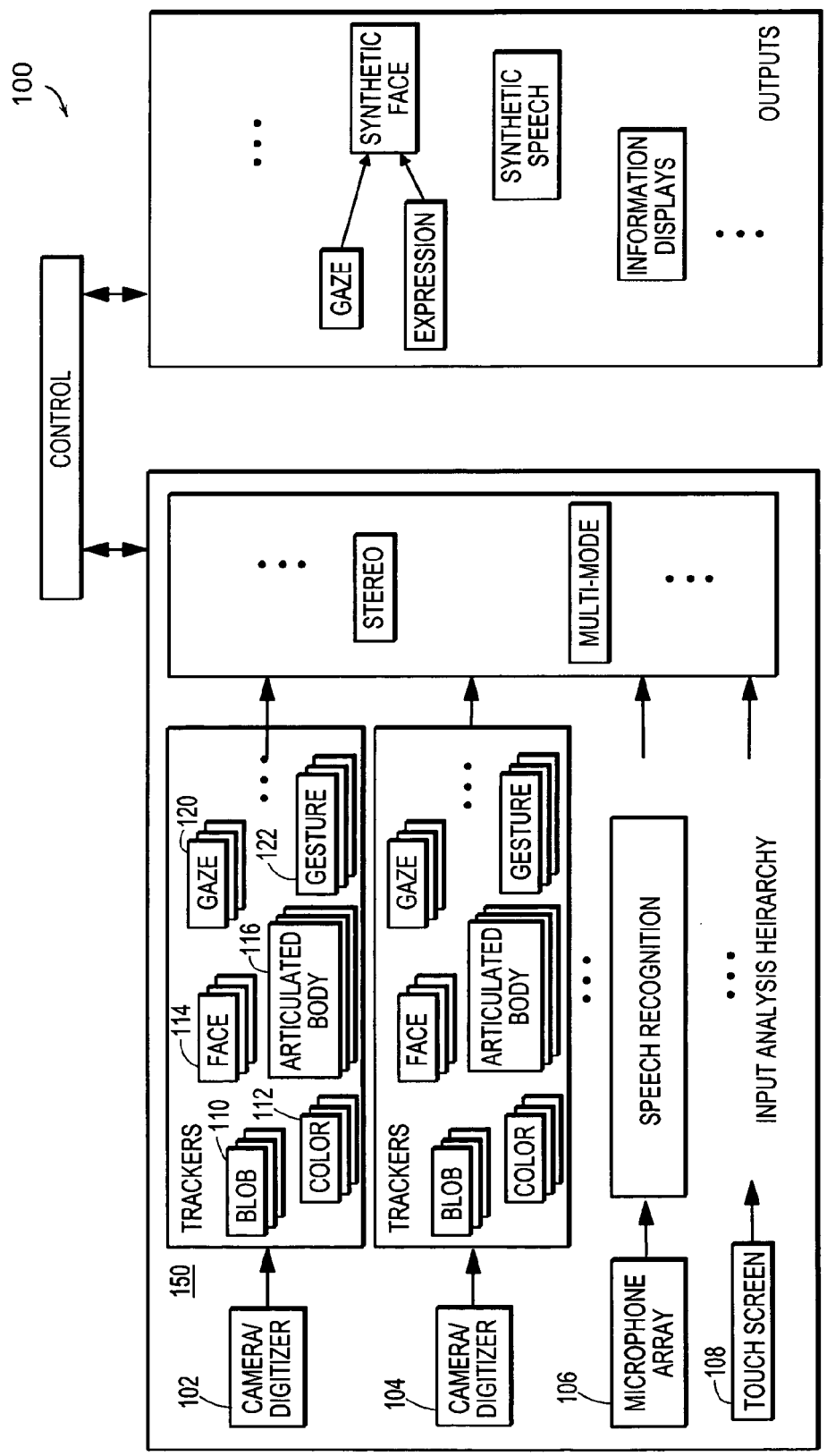
FIG. 1 illustrates the software architecture of a prior art continuous application for processing timestamped data.
Figure 2:
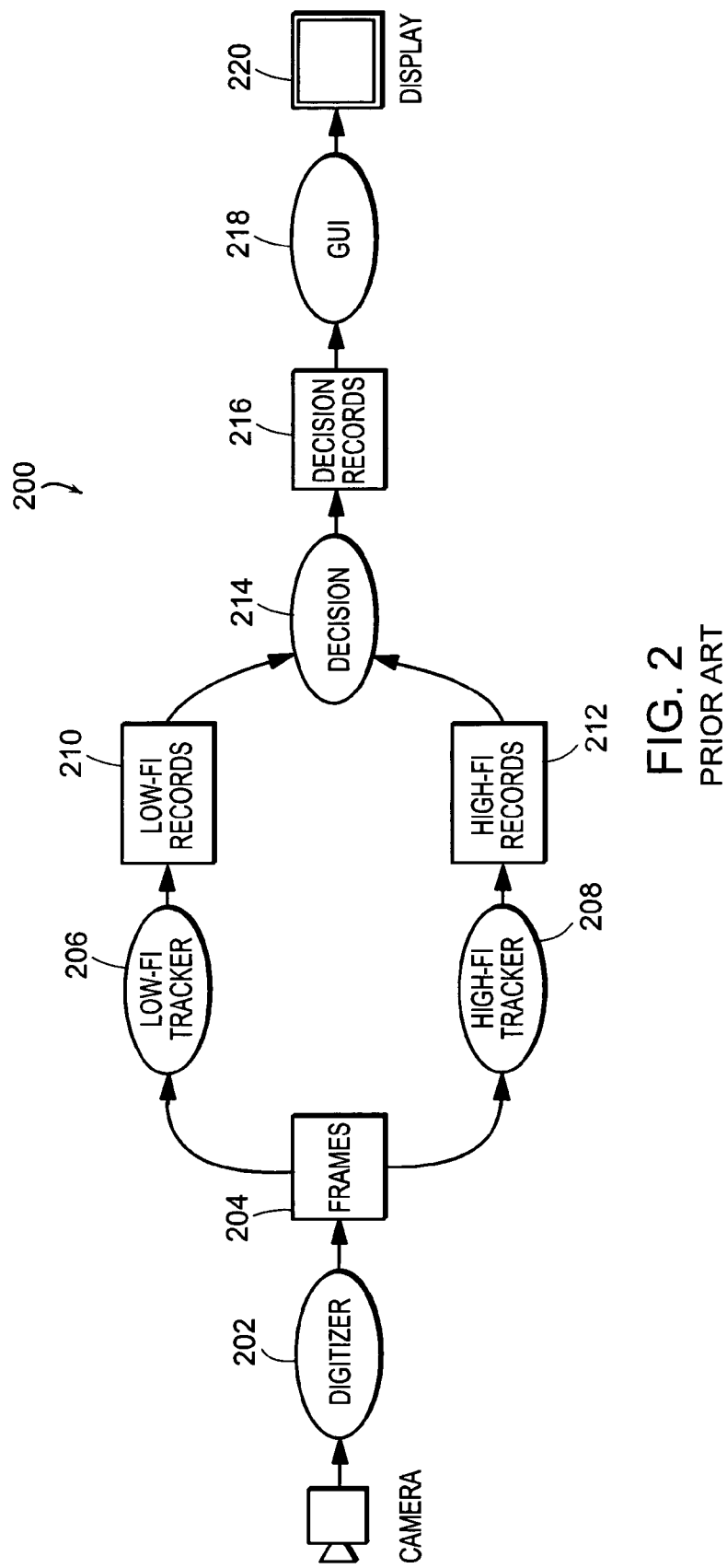
FIG. 2 illustrates a simple vision pipeline for the prior art continuous application shown in FIG. 1.
Figure 4:
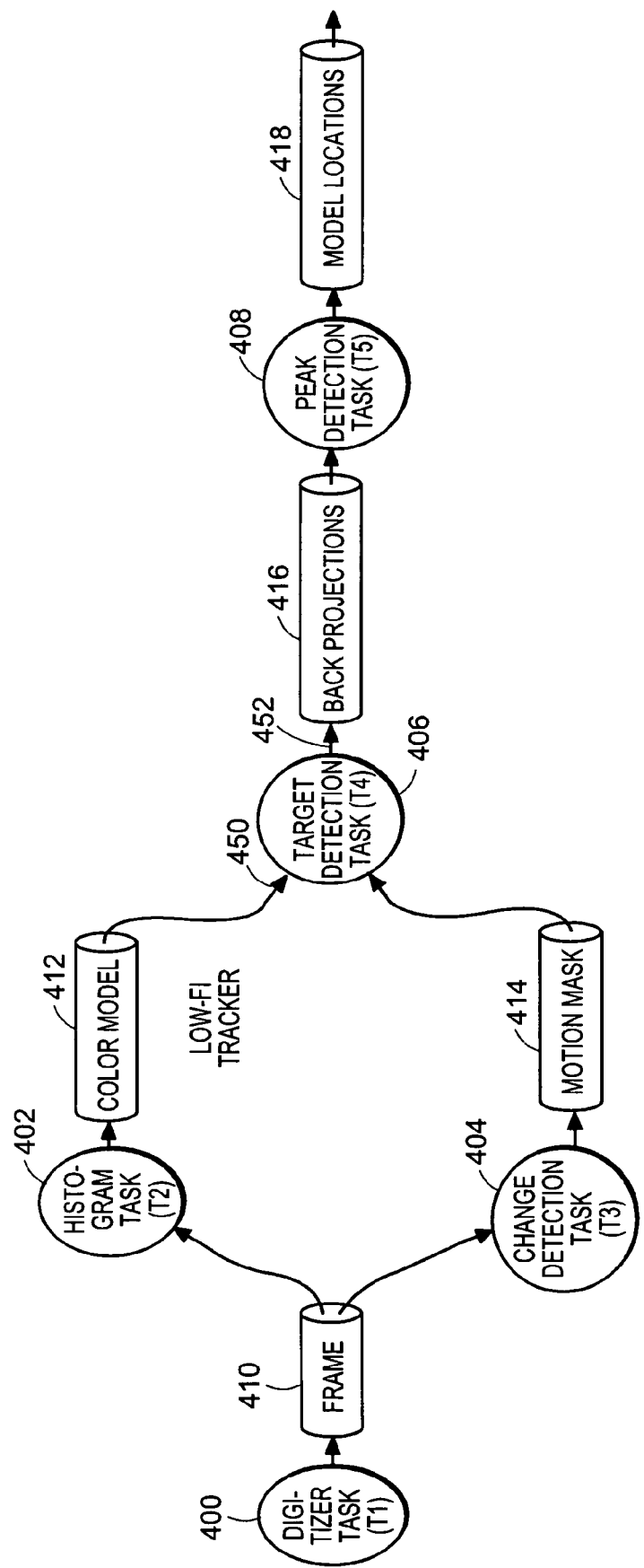
FIG. 4 is a task graph for the color tracker application shown in FIG. 1.

FIG. 4 is a task graph for the color tracker application 112 shown in FIG. 1. The task graph can be viewed abstractly as a bipartite directed graph of nodes. Each node can be a thread or a channel. Both threads and channels have directed edges called input connections and output connections.

The class of applications addressed by the invention are those expressible by a task graph such as that shown in FIG. 4. The distinct tasks or threads (T1–T5) communicate using streams of data called channels. The processing by each thread involves getting items from at least one input channel and putting items on at least one output channel. For example, as shown in FIG. 4, node 400 is a thread which processes data and node 410 is a channel carrying data output from task 400. Node 400 has one output connection to node 410. Node 410 has one input connection from node 400.

The "name" of an item in a channel is it's timestamp. Each item includes a timestamp which is an integer used as an index or tag to identify the item. Typically a thread will get an item with a particular timestamp from an input connection, perform some processing on the data in the item, and then put an item with that same timestamp onto one of its output connections. Items with the same timestamp at different channels represent various stages of processing of the same input.

The color tracker application shown in FIG. 4 includes five separate tasks or threads: a digitizer task (T1) 400, a histogram task (T2) 402, a change detection task (T3) 404, a target detection task (T4) 406 and a peak detection task (T5) 408. A task number (T1–T5) is assigned to each of the tasks. The color tracker's tasks 400, 402, 404, 406, 408 are scheduled by a scheduling system executing in the memory system 306 of the computer system (FIG. 3). The color tracker application also includes channels 410, 412, 414, 416 and 418.

The digitizer task (T1) 400 generates video frames and puts the video frames in channel 410. The histogram task (T2) 402 and the change detection task (T3) 404 perform preprocessing in parallel on the video frames in channel 410. The histogram task (T2) 402 generates color models for the video frames and puts the color models in channel 412. The change detection task (T3) 404 generates motion masks for the video frames 410 and puts the motion masks in channel 414. The target detection task (T4) 406 compares previously acquired color models for each identified individual against the color models in channel 412 using the motion masks in channel 414 to eliminate background regions in the video frame 410 from consideration.

The target detection task (T4) 406 generates a set of back projection images and puts them in channel 416, one image is generated for each identified individual, in which each pixel location has been labeled with the likelihood that it came from the identified individual. The peak detection task (T5) 408 analyzes each of the back projection images in channel 416 separately to identify blobs of high likelihood for each identified individual. The centroids of these blobs give the locations of the identified individuals in the video frame. The input connection from the color model 412 may be locally dependent on the input connection from the motion mask 414.

The time to process an item by a thread varies. In particular, upstream threads (typically faster threads that do low level processing) may produce items that have been dropped by downstream threads doing higher level processing at a slower rate. For example, digitizer task (T1) 400 may generate frames faster than histogram task (T2) 402 can generate color models. An item with a timestamp that is dropped by any thread is called an irrelevant timestamped item. An item with a timestamped item that is completely processed is called a relevant timestamped item. The metric for efficiency is the rate of processing of relevant timestamped items. The work done processing irrelevant timestamped items represents an inefficient use of processing resources.

The target detection task (T4) 406 gets timestamped items from both the color model 412 and the motion mask 414 and operates on the latest timestamped item received. If the histogram task (T2) 402 generates color models faster than the change detection task (T3) 404 generates motion masks, items produced by the slower change detection task (T3) 402 may be dead on arrival when they arrive at the Target Detection task (T4) 406. However, it is not trivial to determine when a timestamped item can be eliminated. Eliminating items based only on timestamp values does not take into account that a thread may be examining individual timed-stamped items out of order.

Figure 5:
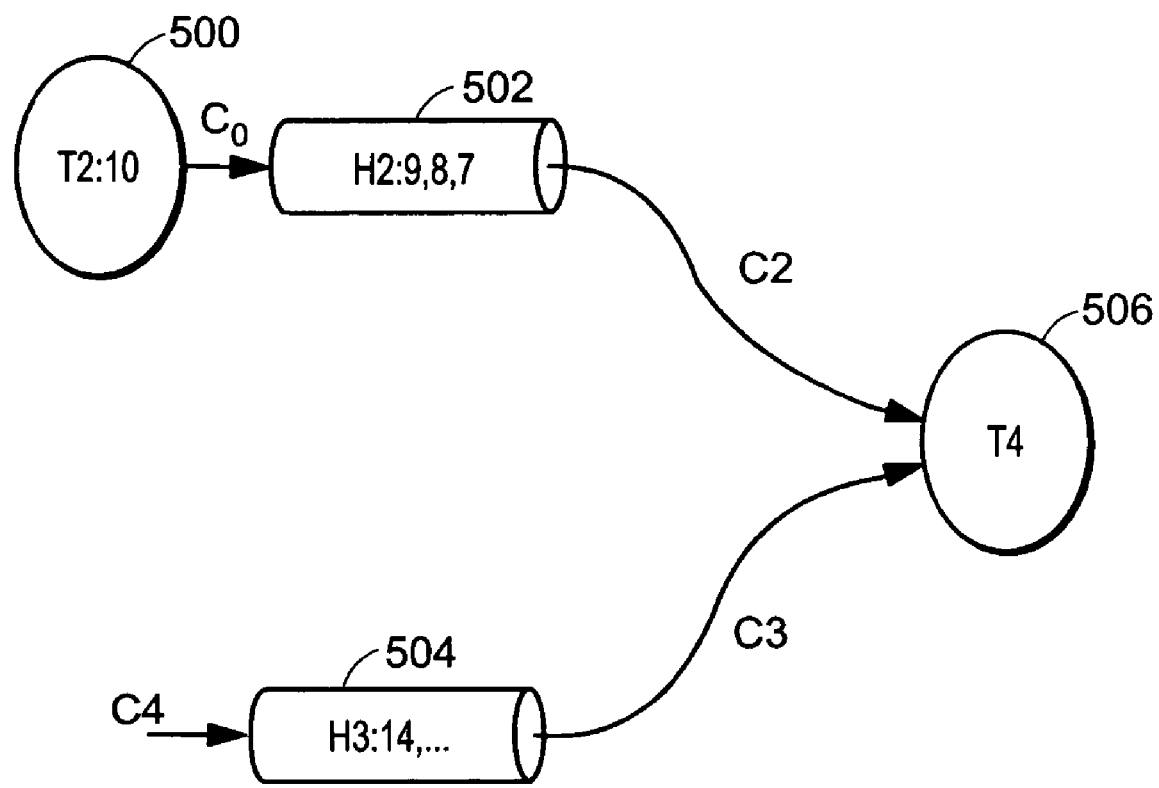
FIG. 5 illustrates a dependent task graph including nodes in which the present invention is used.

FIG. 5 illustrates a dependent task graph including nodes in which the present invention is used. The task graph includes nodes 500, 502, 504 and 506. Nodes 500 and 506 are threads. Nodes 502 and 504 are channels. Thread 506 receives timestamped items from input connections C2 and C3. Thread 506 gets a timestamped item from C2 only if it gets the same timestamped item from C3. For example, thread 506 can be a stereo vision thread which gets the latest timestamped item from one channel 504 and then looks in the other channel 502 for the matching timestamped item. For example, in a stereoscopic vision application timestamps are dependent because parallel processes process the input from each 'eye'.

Connection C2 is locally dependent on connection C3. This relationship is not commutative; that is, C2 depends on C3 does not imply that C3 depends on C2. Thread 506 gets the latest timestamp from C3 and retrieves a timestamped item with timestamp ts. Then thread 506 executes a "get" function from C2 for a data item with timestamp ts. As shown in FIG. 5, the highest or latest timestamp on channel 504 is 14. Channel 502 has timestamps 7, 8 and 9. Thread 500 is about to compute timestamp 10. When thread 506 gets timestamp 14 from C3 it will wait for timestamp 14 from C2 because C2 depends on C3. Thread 506 forwards a backward guarantee to channel 502 indicating that it will not use timestamps earlier than 14.

Upon receiving the backward guarantee from thread 506, channel 502 can eliminate as garbage, timestamps less than 7, 8 and 9. Upon receiving the backward guarantee from channel 502 thread 500 can eliminate as dead computations, thread steps that produce timestamps 10, 11, 12 and 13. The backward guarantee is passed back to predecessors of channel 502 and thread 500.

Figure 6:
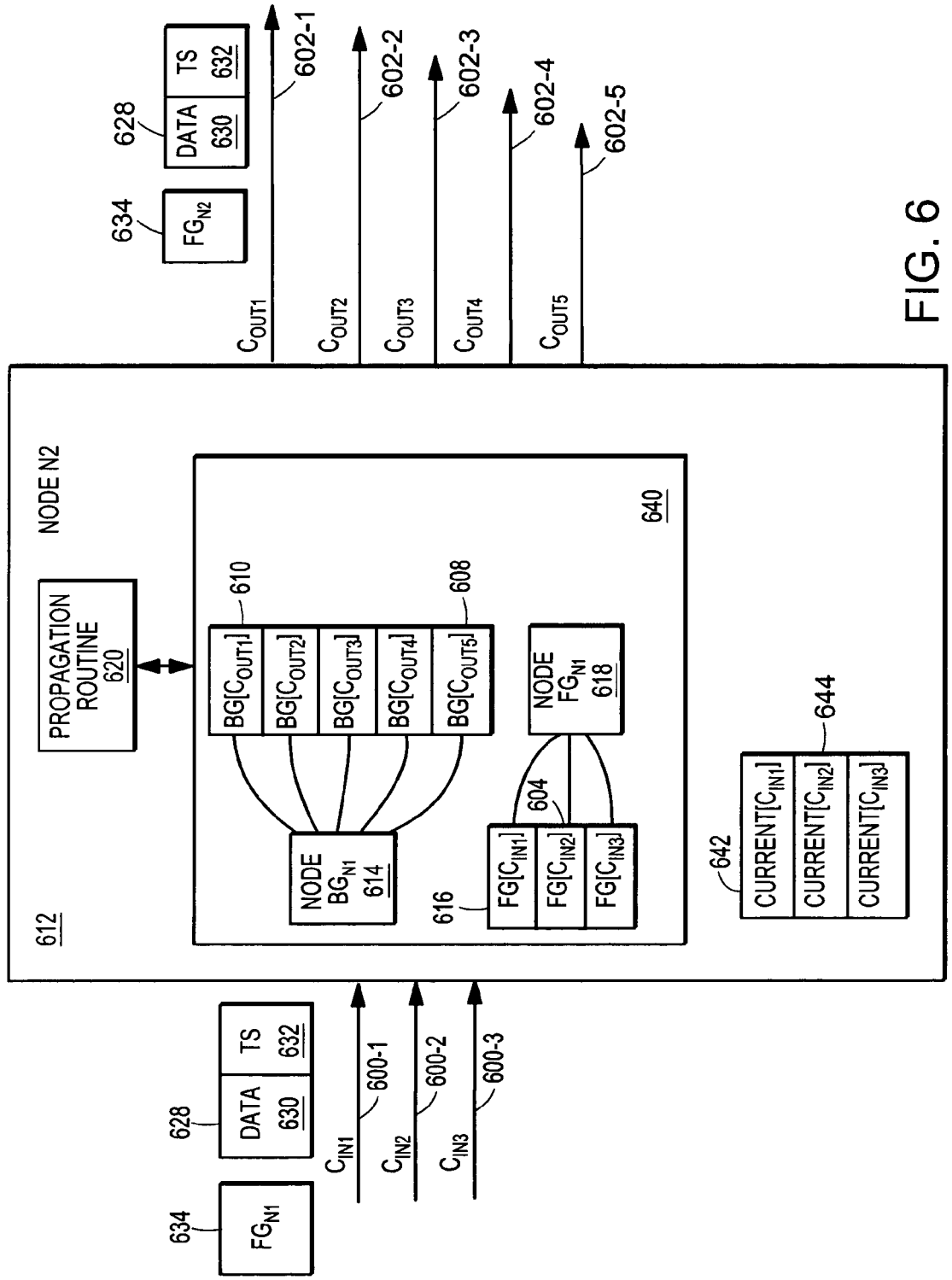
FIG. 6 is a block diagram of a node in a task graph including local timestamp guarantees and a propagation routine.

FIG. 6 illustrates local timestamp guarantees and propagation routines in a node 612 in a task graph. An algorithm in the propagation routine 620 in the node 612 maintains a set of local timestamp guarantees for the respective node. The local timestamp guarantees are used to determine whether an item or a computation for an item can be eliminated in the node.

For a given timestamp, the timestamp guarantee indicates whether a timestamp is a live timestamp or whether it is guaranteed to be a dead timestamp. A timestamp is live at a node if there is some further processing at the node on that timestamped item that might have an effect on some relevant timestamped item of this execution, otherwise it is dead. A timestamp at a node may be dead because it is irrelevant or because it is used. An item is used if all its uses have already completed regardless of whether it is relevant or not. An item may be alive at a node at some execution time but dead at another. An item may be alive at one node but dead at another.

Node N2 612 includes three input connections 600-1, 600-2, 600-3 and five output connections 602-1, ..., 602-5. A data item 628 received at any one of the input connections 600 from a preceding upstream node may be forwarded through any one of the output connections 602 downstream to a successive node. Each data item 628 includes a data field 630 and a timestamp 632 associated with the data 630. If the node 612 is a thread, data stored in the data field 630 can be modified by the thread. The timestamp stored in timestamp field 632 is forwarded with the modified data.

The set of local guarantees 640 are implemented as timestamp markers which separate good (higher) timestamps from bad (equal or lower) ones. The set of local guarantees 640 includes forward guarantees and backward guarantees. A forward guarantee identifies timestamped items that are guaranteed to never leave a node; that is, a data item with an earlier or lower timestamp will not be received from preceding nodes on the respective connection. A backward guarantee identifies timestamps that will not be used by successive nodes. The set of guarantees 640 includes a node backward guarantee 614, a node forward guarantee 618, a forward guarantee vector 616 and a backward guarantee vector 618.

The Forward Guarantee Vector 616 is a vector of connection forward guarantees which includes a slot 604 for each input connection 600 to the node 612. Each slot 604 of the Forward Guarantee vector 616 stores the last forward guarantee communicated to the node over the respective input connection from a preceding node. The last forward guarantee is a guarantee that the node 412 will not receive any data item over the respective input connection with an earlier timestamp. The node Forward Guarantee (FG) 618 for node 612 is computed by selecting the earliest connection forward guarantee stored in each of the slots 604 in the forward guarantee vector 616. In one embodiment, the node forward guarantee is computed each time a data item leaves the node 612 over any one of the output connections 602. The node Forward Guarantee 618 identifies the earliest timestamp that can leave the node 612 over any of the node's output connections.

The Backward Guarantee Vector 610 in node 612 is a vector of connection backward guarantees. There is a slot 608 in the backward guarantee vector 610 for each output connection 602 from the node 612. As shown, Backward Guarantee Vector 610 has five slots 608, one slot for each respective output connection 602-1, ... 602-5. Each slot 608 of the backward guarantee vector 610 stores the last connection backward guarantee communicated back from successive nodes over the respective output connection. In one embodiment, the node Backward guarantee 614 for node 612 is computed from the connection backward guarantees stored in backward guarantee vector 610 each time an item leaves the node 612 over any one of the output connections. Backward processing performed by the propagation routine 620 determines the node backward guarantee 614 for node 612 over all the output connections 602 to the node. The node backward guarantee 614 is computed dependent on the earliest timestamp stored in the slots 608 in the backward guarantee vector 612 and the latest timestamp stored in the forward guarantee vector 616. The node Backward Guarantee (BG) 614 identifies the earliest timestamp that will be used by downstream nodes reached through the output connection 602. Any item received by the node with an earlier timestamp than the backward guarantee is irrelevant or dead at all input connections to the node 612.

Both forward and backward processing is local to the connection in that they are based on guarantees available locally. Backward and forward processing compute new guarantees to propagate forward or backward to neighboring nodes. The information propagated is a guarantee that can be used to separate good timestamps from bad ones in each node. For example, forward processing in node 612 determines the node forward guarantee to propagate to successive nodes. The node forward guarantee 618 associated with node 612 indicates the earliest timestamp that can reach node 612.

A unified view of garbage collection and dead computation elimination results from a single algorithm included in the propagation routine 620 which determines items with dead timestamps at all nodes. Items with dead timestamps are interpreted differently depending on the node type. If the node is a channel, items in the channel with timestamps earlier than the guarantees are dead timestamps and can be removed by a garbage collector. For example, items with dead timestamps can be marked as "consumed" indicating that they can be collected as garbage. If the node is a thread, items with timestamps earlier than the guarantees that have not yet been produced by the thread represent dead computations and can be eliminated. Dead computation elimination is distinct from dead code elimination because it is not the static code that is eliminated but rather an instance of the code's dynamic execution. For example, the thread can skip over dead computations by checking a dead computation marker for the thread when determining the next computation to process.

In one embodiment, the algorithm in the propagation routine 620 executes each time an item 634 is transferred from a thread to a channel or a channel to a thread. The algorithm identifies what timestamps are probably of no use in the node. This forms the basis for both dead item collection and dead computation elimination. A forward guarantee 634 computed by the forwarding node 612 is forwarded with the data item. The forward guarantee forwarded can be either the node forward guarantee 618 or the connection forward guarantee stored in the respective connection slot 604 in the 618 forward guarantee vector 616. In the embodiment shown in FIG. 6, forward guarantee 634 is the node forward guarantee which is computed from the connection forward guarantees stored in the forward guarantee vector 616 when the data item 628 is being forwarded from the node. In alternate embodiments, the forward guarantee can be forwarded independently of the data item 628. For example, the forward guarantee can be transmitted at regular intervals determined by the node 612.

In one embodiment, the node forward guarantee for a preceding node (N1) is forwarded to node (N2) 612 by writing the forwarded node forward guarantee 634 for the preceding node (N1) into slot 604 for connection ($C_{IN1}$) 600-1 in the forward guarantee vector (N2) 616 in node 612 as shown below:

$$ForwardGuaranteeVec_{N2}[C_{IN2}] = FG_{N1}$$

where:

$C_{IN2}$ is the connection at node N2 at which the forward guarantee for N1 was received.

ForwardGuaranteeVec is the forward guarantee vector stored in node N2.

$FG_{N1}$ is the forward guarantee for preceding node N1.

The forward guarantee propagated by node N2 to successive nodes is computed by selecting the earliest timestamp guarantee stored in the Forward Guarantee Vector 616 as shown below:

$$FG_{N2} = \text{MIN}_{(\text{over all input connections } C \text{ of node } N2)} \text{ of ForwardGuaranteeVec}_{N2}[C]$$

where:

$FG_{N2}$ is the forward guarantee for node N2 to be forwarded to all successive nodes.

C is all input connections ($C_{IN1}$, $C_{IN2}$, $C_{IN3}$).

Thus, the propagated forward guarantee from Node N2 guarantees that successive nodes will not receive data from preceding nodes with an earlier timestamp.

Identification of dead timestamp and dead computations can be optimized by taking monotonicity into account when computing the forward guarantee to propagate because a monotonic thread only processes data received with the latest timestamp. Monotonicity is an attribute of a connection that implies the forward march of time and is embodied in the thread. This occurs, for example, in the common case of a thread's input connection, where the thread issues a command to get the latest timestamp on an input connection from a channel. For example, a thread can execute a "get" function to get the next data item from an input connection. The "get" function returns the size, content and timestamp of a specified data item to the calling thread. Assume that the timestamp of the data item that the thread gets is '352'. Then as part of managing its own virtual time, the thread issues a command that guarantees that it is completely done with any timestamp below '352' on that input connection. Such a guarantee from a thread indicates that timestamps earlier than '352' are irrelevant and can be removed as garbage from the channel so far as the thread is concerned. Both "thread to channel" and "channel to thread" connections can be monotonic.

Taking monotonicity into account, the propagated forward guarantee is computed dependent on the last timestamped item received on the input connection to the node. The node forward guarantee 618 is not relevant and is thus not computed. A current connection vector 642 is stored in each node. The current connection vector has a slot 644 for each input connection 600. The respective slot stores the last timestamp received with a data item 620 over the connection. The forward guarantee is propagated to the successive node by writing the computed forward guarantee in the slot for the respective connection in the forward guarantee vector in the successive node as follows:

$$ForwardGuaranteeVec_{N2}[C] = \text{MIN}(\text{MAX}_{(\text{over all input connections } Cin \text{ of node } N2)} \text{ of ForwardGuaranteeVec}_{N1}[C_{in}]), \text{current}_C[C_{in}]))$$

where:

$\text{current}_C[C_{in}]$ is the largest (latest) actual timestamp to cross monotonic connection $C_{in}$.

The forward guarantee for an input connection is computed by computing the latest timestamp received on each input connection and stored in both the current connection vector 642 and the forward guarantee vector 616 for all input connections. The latest timestamp is selected for each input connection because the forward guarantee stored for each input connection in the forward guarantee vector and the current timestamp stored for each input connection in the $current_c$ vector are independent guarantees so the latest of the two is selected in order to identify the greatest number of irrelevant timestamps. The earliest of all of the latest timestamps for each input connection is selected as the forward guarantee to be propagated to successive nodes because the earlier timestamp received at an input connection may leave the node. For example, if there are two input connections and the forward guarantee is not propagated with each forwarded data item, ForwardGuaranteeVec stores 10 and 12 and $current_C$ stores 11 and 13, the latest timestamps for input connection 1 is 11, and the latest connection for input connection 2 is 13. The earliest timestamp of 11 and 13 is 11. Thus, the forward guarantee propagated to successive nodes is 11.

Identification of irrelevant or dead timestamps and irrelevant or dead computations can be further optimized by taking transfer functions into account when computing the connection forward guarantee. For example, consider a thread that has input connections i1, i2 and i3 and output connections o4 and o5. If data items output to o4 are only dependent on data items received on i1 and i2, the connection forward guarantee from the thread to o4 can be computed as the minimum over the forward guarantees for connections i1 and i2 only. The forward guarantee propagated to a successive node N2 is computed over input connection $C_{IN}$ to preceding node N1 as follows:

ForwardGuaranteeVec$_{N2}$[C]=MIN$_{(over\ all\ input\ connections\ Cin\ of\ node\ N2\ belonging\ to\ the\ transfer\ function)}$of
ForwardGuaranteeVec$_{N1}$[Cin]

The process of updating the set of guarantees 640 in each node is associated with the flow of items through the system. In one embodiment, as a timestamped item is transferred from a node to a successive node, the forward guarantee at the successive node and the backward guarantee at the node are updated. The computed node forward guarantee is forwarded with the data item to the successive node. The successive node stores the computed node forward guarantee received on the connection in the slot 604 corresponding to the input connection in its forward guarantee vector. Thus, the computed node forward guarantee is propagated forward to all successive nodes with the data item. This enables continual and aggressive identification of dead timestamps in both nodes.

Backward processing selects the earliest timestamp that can possibly be used by successive nodes. The node backward guarantee 614 is computed dependent on the earliest timestamp stored in the backward guarantee vector 610 and the latest timestamp stored in the forward guarantee vector. Each slot 608 of the backward guarantee vector 610 holds the last connection backward guarantee communicated back to the node from successive nodes over the respective output connection 602. Node Backward guarantee 614 is computed from backward guarantee vector 610 each time an item leaves node 612 over any one of the output connections 602.

The node Backward Guarantee 614 identifies dead timestamps for node 612. If node 612 is a channel, items in the channel with timestamps that are dead can be removed as garbage. Timestamps that arrive at a channel where they have been previously determined to be dead, are dead on arrival and need not be stored in the channel. If the node 612 is a thread, dead timestamped items that have not yet been computed by the thread are dead computations and need not be computed. Garbage collection can be performed anytime there is a backward propagation to forward a backward guarantee for a connection to a preceding node. The propagated backward guarantee is the earliest timestamp that will not be used by successive nodes. The earliest timestamp is computed by first determining the latest timestamp forwarded from preceding nodes over input connections 600. Backward transfer functions taken into account by selecting a subset of the input connections. Mononoticity is taken into account from timestamped data items received. The latest timestamp received over the subset of connections is selected. The backward propagation guarantee is the later of the latest timestamp received from a preceding node or the earliest timestamp that will be used by successive nodes.

Returning to FIG. 5, after T4 receives timestamped item 14, T4 computes a backward guarantee to be propagated back to channel H2. The propagated guarantee is the later of the latest timestamp received from channel 3 or the earliest timestamp that will be used by successive nodes. In this case, the latest timestamp is 14 assuming successive nodes have not yet received timestamp 14 because T4 has not yet processed timestamp 14. The backward guarantee propagated back to channel H2 is 14 guarantees that timestamps earlier than 14 will not be used by T4. Thus items with timestamps earlier than 14 that would have been forwarded to T4 can be discarded by preceding nodes.

Returning to FIG. 6, the algorithm for computing the backward guarantee propagated back from Node N2 through connection C to preceding node N1 taking monotonicity and backward transfer functions into account is shown below:

CurrentMAX$_{C/N2}$=MAX(over $C_{in}$ such that $C_{in}$
   belongs to the backward transfer function of C
   at N2)(Current$_{Cin}$[$C_{in}$], ForwardGuaranteeVec$_{N2}$
   [$C_{in}$])

CurrentMIN$_{C/N2}$=MIN(over Cout such that Cout
   belongs to the backward transfer function of C
   at N2) (BackwardGuaranteeVec$_{N2}$[Cout])

BackwardGuaranteeVec$_{N1}$[C]=MAX(CurrentMAX$_{C/N2}$, CurrentMIN$_{C/N2}$)

where:

Current MAX$_{C/N2}$ is the latest timestamp received over any of the input connections $C_{IN}$ from preceding nodes to node N2 or propagated as a forward vector over any of the input connection to N2.

Current MAX$_{C/N2}$ is the earliest timestamp propagated back from successive nodes over any of the output connections $C_{OUT}$ from N2.

BackwardGuaranteeVec [$C_{N1}$] is the backward guarantee propagated back over the respective input connection$_C$ to preceding node N1.

Backward Transfer function: includes input and output connections $C_{in}$ is the subset of connections in the backward transfer function that are input connections.

$C_{out}$ is the subset of connections in the backward transfer function that are output connections.

C is the connection for which the backward guarantee is being computed.

Figure 7:
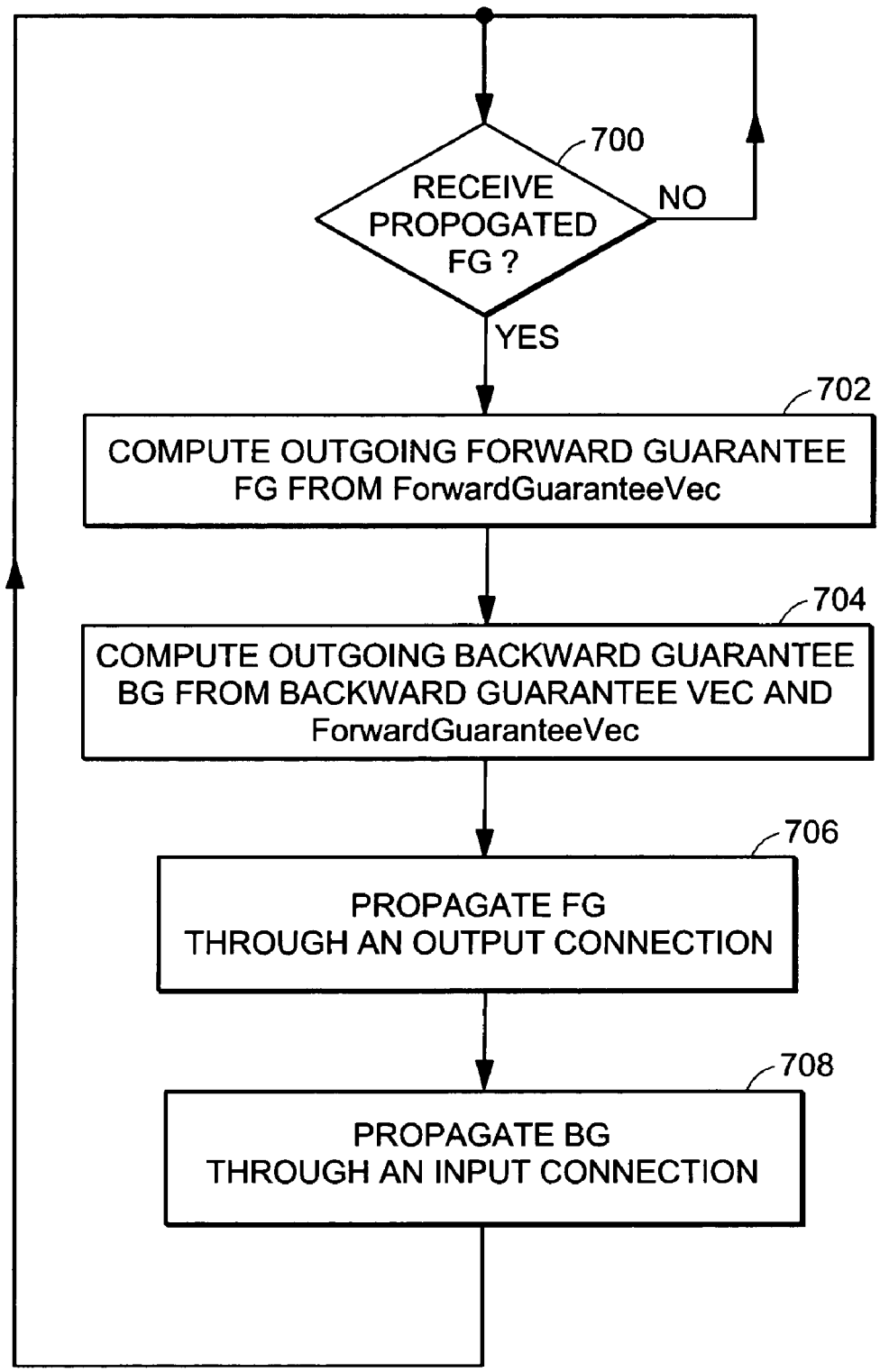
FIG. 7 is a flow graph of the process implemented in the propagation routine in each node to update the set of guarantees upon receiving a propagated forward guarantee from a preceding node.

FIG. 7 is a flow graph of the process implemented in the propagation routine in node 612 to update the set of guarantees 540 (FIG. 6). FIG. 7 is described in conjunction with FIG. 6.

At step 700, node 612 determines if a forward guarantee has been received from a preceding node. Upon receiving a propagated forward guarantee, processing continues with step 702.

At step 702, the incoming forward guarantee received is stored in the respective slot 604 in the Forward Guarantee Vector 616 dependent on the receiving input connection 600. The node forward guarantee 618 to be propagated to successive nodes is computed by selecting the earliest timestamp stored in the Forward Guarantee Vector when the item is being forwarded on one of the output connections 602. Processing continues with step 704.

At step 704, the node backward guarantee BGN1 to be propagated to preceding nodes is computed from both the Backward Guarantee Vector 610 and the Forward Guarantee Vector 616. The computed node backward guarantee $BG_{N1}$ is the earliest timestamp that will be used by successive nodes. Processing continues with step 606.

At step 706, the node forward guarantee $FG_{N2}$ is forwarded as the propagated forward guarantee 634 to the successive node. Processing continues with step 708. The node forward guarantee guarantees that the preceding node will not forward an earlier timestamp.

At step 708, the node backward guarantee $BG_{N2}$ is forwarded as the propagated backward guarantee to the preceding node. Processing continues with step 700 to wait for the next propagated forward guarantee 634 to be forwarded to successive nodes.

Figure 8:
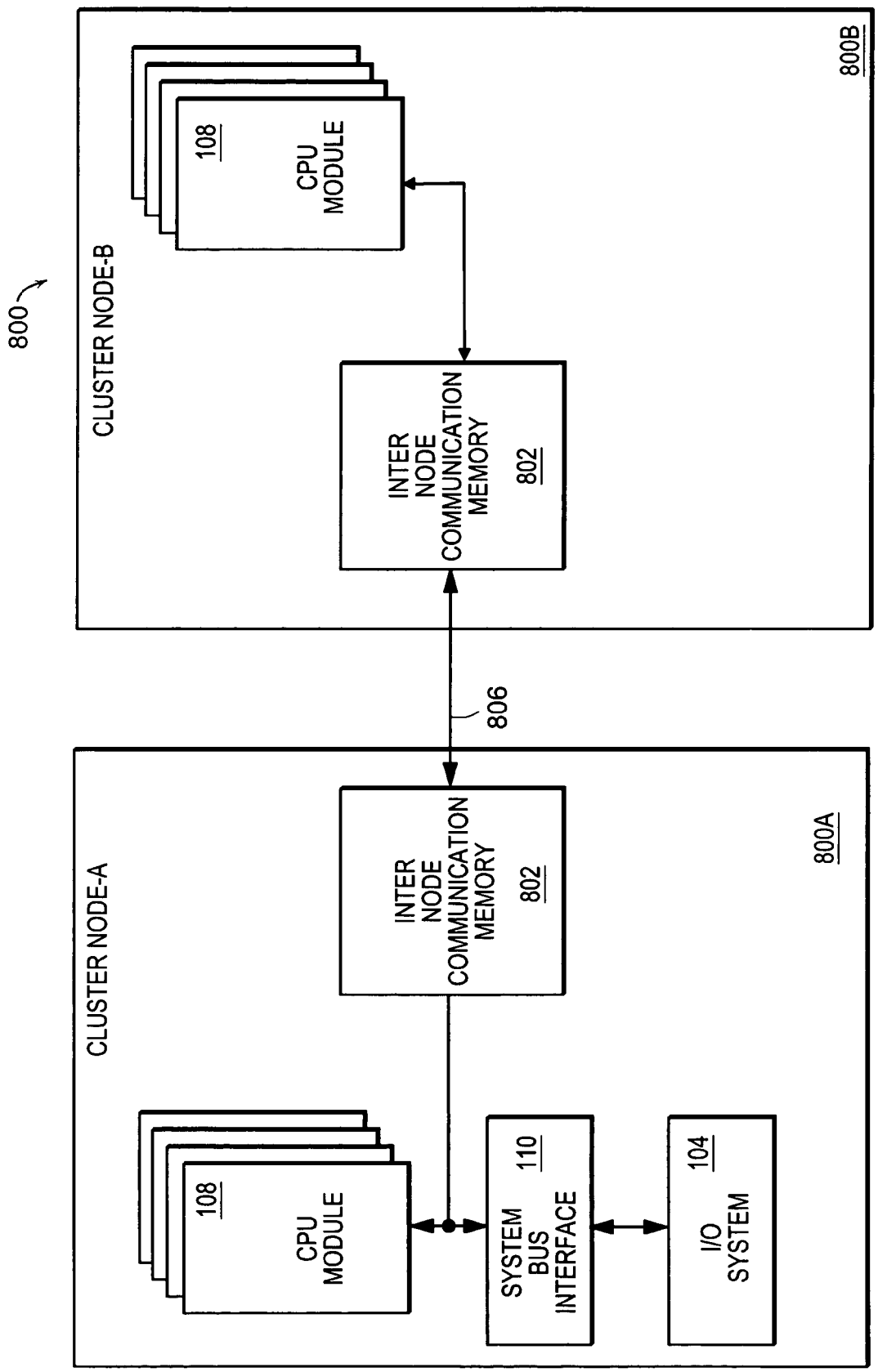
FIG. 8 is a block diagram of a cluster of computer systems in which the present invention may be used.

FIG. 8 is a block diagram of a cluster parallel programming system in which the present invention may be used. The cluster of computer systems 800 as shown includes two cluster nodes, cluster node_A 800A and cluster node_B 800B. Each of the cluster nodes is a computer system 100 as described in conjunction with FIG. 1. The nodes 800A, 800B communicate through a communications link 806 connecting inter-node communication memory 802 provided in each of the cluster nodes 800A, 800B. The cluster of computer systems 900 is not limited to two cluster nodes, as shown there can be more than two cluster nodes in a cluster parallel programming system.

In one embodiment the cluster parallel programming system is implemented on a cluster of 4-processor Alpha Symmetric Multi-Processor (SMPs) interconnected by the Memory Channel 802 and running Tru64 Unix. In another embodiment the cluster parallel programming system is implemented on clusters of x86 Processors or StrongArm Processors running Solaris, NT or Linux.

A system program includes a dynamic collection of threads communicating timestamped data items through channels. Threads can be created to run anywhere in the cluster. Channels can be created anywhere in the cluster and have cluster-wide unique names, similar to Unix sockets. Threads can connect to channels to perform input and output using 'get' and 'put' operations. The get and put operations can specify the timestamp value for the data item to put into a channel or get from a channel. A thread marks a particular channel item as garbage from its point of view by marking the item as consumed using a consume call on the connection through which it received the item.

If the system is implemented on a cluster, locality has an entirely different meaning. Graph nodes are partitioned among cluster nodes 800A, 800B. So any pair of adjacent graph nodes may be co-located on the same cluster node or on distinct cluster nodes. A propagation lag arises because forward and backward guarantees are not propagated between adjacent graph nodes until an item is propagated between them. This delay is unnecessary between graph nodes co-located on the same cluster node.

To take propagation delays into account all the forward and backward data structures for all the graph nodes on a given cluster node are shared. Whenever a change (forward or backward) is propagated to a cluster node 800A, 800B, the change is propagated immediately through the data structures corresponding to any adjacent graph nodes that reside on the cluster node. Whenever an item is transferred between two cluster nodes 800A, 800B all guarantees relating to the two cluster nodes 800A, 800B are transferred.

The invention can be used in any application in which data can be dropped during processing. In the embodiment described, the invention is used to maximize the processing rate for items with relevant timestamps; that is, system throughput. However, in other embodiments the invention can be used to maximize thread throughput for a thread; that is, to maximize the number of items processed by that thread. For example, in an application in which a thread is gathering statistics about frames, the thread must process as many items as possible even if subsequent processing on these items do not proceed through the entire system.

The invention has applications in a variety of contexts, for example, in distributed parallel interactive multimedia applications and gaming or animation applications. The invention can be used for expressing the temporal dependence of computations on one another in a distributed parallel interactive multimedia application such as, point of sale and surveillance. In a distributed parallel interactive gaming or animation application, the invention allows the players or actors to express their evolving state temporally allowing other players or actors to take decisions on the global state of the system. The invention also has applicability in applications such as robots, smart vehicles, and interactive animation. These applications all have advanced input/output modes such as, computer vision, very computationally demanding components with dynamic structure, and real-time constraints because they interact with the real world.

The invention provides both a space advantage and a time advantage. The space advantage is provided by pruning the data items of interest to the application at runtime. The time advantage is provided by pruning the computations of interest to the application at runtime. Thus, in the color tracker application shown in FIG. 4, the invention improves the completed frame rate by not performing unnecessary processing and reducing unnecessary data stored in memory. Eliminating data to be processed by the application, reduces the amount of data to be stored and thus the data to be processed can be stored in a first level cache instead of a second level cache or disk because there is more efficient use of resources in the system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of garbage collection and scheduling performed at individual nodes of a processing graph, comprising the computer implemented steps of:

for a given node, based on (a) forward guarantees received from preceding nodes indicating earliest timestamps to be sent from the preceding nodes and (b) backward guarantees received from successive nodes indicating earliest timestamps to be used at the successive nodes, determining timestamp requirements for data to be processed in the node;

returning to preceding nodes a backward guarantee of earliest timestamps to be used at the node; and at the preceding nodes, eliminating data and computations corresponding to timestamps earlier than the backward guarantee.

2. The method as claimed in claim 1 further comprising the step of:

propagating a forward guarantee to successive nodes based on forward guarantees received from preceding nodes each time an item leaves the node.

3. The method as claimed in claim 2 wherein the propagated forward guarantee is the earliest of all the received forward guarantees.

4. The method as claimed in claim 2 wherein a forward guarantee for the node is forwarded to a downstream node with the item.

5. The method as claimed in claim 1 further comprising the step of:

periodically propagating a forward guarantee to successive nodes based on forward guarantees received from preceding nodes.

6. The method as claimed in claim 1 further comprising the step of:

propagating the backward guarantee to preceding nodes each time an item enters the node.

7. The method as claimed in claim 6 wherein the backward guarantee is the timestamp selected from the latest timestamp received from preceding nodes and the earliest timestamp in received backward guarantees from successive nodes.

8. The method as claimed in claim 1 wherein the preceding node is a thread.

9. The method as claimed in claim 8 further comprising the step of:

eliminating computations for items having a timestamp earlier than the latest backward guarantee propagated to the preceding node.

10. The method as claimed in claim 1 wherein the preceding node is a channel.

11. The method as claimed in claim 10 further comprising the step of:

eliminating items having a timestamp earlier than the latest backward guarantee propagated to the preceding node.

12. The method as claimed in claim 11 wherein the step of eliminating is performed each time an item enters the channel.

13. Computer apparatus in individual nodes of a processing graph that performs garbage collection and scheduling, comprising:

a processor; and a propagation routine which, for a given node, determines time-stamp requirements for data to be processed in the node based on (a) forward guarantees received from preceding nodes indicating earliest time-stamps to be sent from the preceding nodes and (b) backward guarantees received from successive nodes indicating earliest time-stamps to be used at the successive nodes; and a backward guarantee of the earliest time-stamp to be used at the node, the backward guarantee being returned to preceding nodes and used at the preceding nodes to eliminate data and computations corresponding to time-stamps earlier than the backward guarantee.

14. The apparatus as claimed in claim 13 wherein the propagation routine propagates a forward guarantee to successive nodes based on forward guarantees received from preceding nodes each time an item leaves the node.

15. The apparatus as claimed in claim 14 wherein the propagated forward guarantee is the earliest of all the received forward guarantees.

16. The apparatus as claimed in claim 13 wherein the propagation routine periodically propagates a forward guarantee to successive nodes based on forward guarantees received from preceding nodes.

17. The apparatus as claimed in claim 13 wherein the propagation routine propagates the backward guarantee to preceding nodes each time an item enters the node.

18. The method as claimed in claim 17 wherein the backward guarantee is the timestamp selected from the latest timestamp received from preceding nodes and the earliest timestamp in received backward guarantees from successive nodes.

19. The apparatus as claimed in claim 13 wherein the preceding node is a thread.

20. The apparatus as claimed in claim 19 wherein the propagation routine eliminates computations for items having a timestamp earlier than the latest backward guarantee propagated to the preceding node.

21. The apparatus as claimed in claim 13 wherein the preceding node is a channel.

22. The apparatus as claimed in claim 21 wherein the propagation routine eliminates items having a timestamp earlier than the latest backward guarantee propagated to the preceding node.

23. The apparatus as claimed in claim 22 wherein the propagation routine eliminates items each time an item enters the channel.

24. The apparatus as claimed in claim 14 wherein the propagation routine forwards a forward guarantee for the node to a downstream node with the item.

25. Computer apparatus in individual nodes of a processing graph that performs garbage collection and scheduling, comprising:

a processor; and means for propagating which determines timestamp requirements for data to be processed in a node based on (a) forward guarantees received from preceding nodes indicating earliest timestamps to be sent from the preceding nodes and (b) backward guarantees received from successive nodes indicating earliest timestamps to be used at the successive nodes; and guarantee means for providing a backward guarantee of the earliest timestamp to be used at the node, local guarantee means returning the backward guarantee to preceding nodes and the preceding nodes using the backward guarantee to eliminate data and computations corresponding to timestamps earlier than the backward guarantee.

26. The apparatus as claimed in claim 25 wherein the means for propagating propagates a forward guarantee to successive nodes based on forward guarantees received from preceding nodes each time an item leaves the node.

27. The apparatus as claimed in claim 26 wherein the propagated forward guarantee is the earliest of all the received forward guarantees.

28. The apparatus as claimed in claim 25 wherein the means for propagating periodically propagates a forward guarantee to successive nodes based on forward guarantees received from preceding nodes.

29. The apparatus as claimed in claim 25 wherein the means for propagating propagates the backward guarantee to preceding nodes each time an item enters the node.

30. The method as claimed in claim 29 wherein the backward guarantee is the timestamp selected from the latest timestamp received from preceding nodes and the earliest timestamp in received backward guarantees from successive nodes.

31. The apparatus as claimed in claim 25 wherein the preceding node is a thread.

32. The apparatus as claimed in claim 31 wherein the means for propagating eliminates computations for items having a timestamp earlier than the latest backward guarantee propagated to the preceding node.

33. The apparatus as claimed in claim 25 wherein the preceding node is a channel.

34. The apparatus as claimed in claim 33 wherein the means for propagating eliminates items having a timestamp earlier than the latest backward guarantee propagated to the preceding node.

35. The apparatus as claimed in claim 34 wherein the means for propagating eliminates items each time an item enters the channel.

36. The apparatus as claimed in claim 25 wherein the means for propagating forwards a forward guarantee for the node to a downstream node with the item.

* * * * *